(12) United States Patent
Jarrold et al.

(10) Patent No.: US 10,816,518 B2
(45) Date of Patent: Oct. 27, 2020

(54) INTERFACE PROBE

(71) Applicant: Micromass UK Limited, Wilmslow (GB)

(72) Inventors: Richard W. Jarrold, Cheshire (GB); Gareth R. Jones, Cheshire (GB)

(73) Assignee: Micromass UK Limited, Wilmslow (GB)

( * ) Notice: Subject to any disclaimer, the term of this patent is extended or adjusted under 35 U.S.C. 154(b) by 620 days.

(21) Appl. No.: 15/466,297

(22) Filed: Mar. 22, 2017

(65) Prior Publication Data

US 2017/0284983 A1 Oct. 5, 2017

(30) Foreign Application Priority Data

Mar. 22, 2016 (GB) .................................. 1604882.9

(51) Int. Cl.
*H01J 49/04* (2006.01)
*G01N 30/60* (2006.01)
*G01N 30/72* (2006.01)

(52) U.S. Cl.
CPC ..... *G01N 30/7206* (2013.01); *G01N 30/7233* (2013.01); *H01J 49/0431* (2013.01); *G01N 30/72* (2013.01); *G01N 2030/6013* (2013.01); *H01J 49/0422* (2013.01)

(58) Field of Classification Search
CPC .............. G01N 30/6604; G01N 30/72; G01N 30/7206; G01N 2030/6008; G01N 2030/7226; H01J 49/04; H01J 49/0404; H01J 49/0422; H01J 49/0468; H01J 49/165; H01J 49/167

See application file for complete search history.

(56) References Cited

U.S. PATENT DOCUMENTS

| 4,209,696 | A | * | 6/1980 | Fite | ......................... | H01J 49/04 250/281 |
| 4,391,778 | A | | 7/1983 | Andresen et al. | | |
| 4,454,749 | A | * | 6/1984 | Guillemin | .............. | B01D 15/14 73/23.39 |
| 4,650,964 | A | * | 3/1987 | Vincent | .................. | G01N 30/30 219/390 |
| 4,728,776 | A | * | 3/1988 | Vincent | .................. | G01N 30/30 219/390 |

(Continued)

FOREIGN PATENT DOCUMENTS

| EP | 0298597 A2 | 1/1989 | | |
| EP | 0410341 A2 | * 1/1991 | ............. | G01N 30/28 |

(Continued)

OTHER PUBLICATIONS

Combined Search and Examination Report for GB Patent Application No. GB1704454.6, dated Sep. 21, 2017.

(Continued)

*Primary Examiner* — Katherine Zalasky McDonald (57) ABSTRACT

A GC fitting for an inner tube of a heated transfer line of a gas chromatography interface probe, the fitting comprising a first section comprising a substantially cylindrical projection for fluid connection to a GC source in use, and a second section having a larger radius than the first section in at least one direction, the second section being provided with at least one flat.

8 Claims, 12 Drawing Sheets

(56) References Cited

U.S. PATENT DOCUMENTS

| | | | | |
|---|---|---|---|---|
| 4,735,259 A * | 4/1988 | Vincent | ............ | G01N 30/30 165/135 |
| 4,766,760 A * | 8/1988 | Poshemansky | ........ | G01N 30/38 73/23.35 |
| 4,902,891 A * | 2/1990 | Vestal | ............ | G01N 30/7253 250/281 |
| 4,985,625 A * | 1/1991 | Hurst | ............ | H01J 49/0404 250/281 |
| 4,988,870 A | 1/1991 | Diehl | | |
| 5,289,003 A * | 2/1994 | Musser | ............ | G01N 30/7253 250/281 |
| 5,736,739 A * | 4/1998 | Uber | ............ | G01N 27/622 250/287 |
| 5,965,883 A * | 10/1999 | Lee | ............ | H01J 49/167 250/288 |
| 6,006,584 A | 12/1999 | Itoi | | |
| 6,667,474 B1 * | 12/2003 | Abramson | .......... | H01J 49/0404 210/634 |
| 7,958,770 B2 * | 6/2011 | Kyle | ............ | G01N 30/30 73/23.41 |
| 8,180,203 B2 * | 5/2012 | Kurano | ............ | H05B 3/42 392/311 |
| 8,642,952 B2 * | 2/2014 | Jarrell | ............ | G01N 30/7206 250/288 |
| 8,759,758 B2 * | 6/2014 | Steiner | ............ | G01N 30/7206 250/288 |
| 8,808,629 B2 * | 8/2014 | Gerstel | ............ | G01N 30/12 250/288 |
| 2002/0011561 A1 * | 1/2002 | Park | ............ | H01J 49/0404 250/288 |
| 2007/0104471 A1 * | 5/2007 | Hannigan | ............ | H01J 49/0422 392/478 |
| 2008/0142698 A1 * | 6/2008 | Atherton | ............ | H01J 49/0404 250/282 |
| 2010/0005855 A1 | 1/2010 | Silva et al. | | |
| 2010/0224695 A1 * | 9/2010 | Wu | ............ | B05B 5/001 239/3 |
| 2012/0169040 A1 | 7/2012 | Barnett et al. | | |
| 2013/0227831 A1 | 9/2013 | Nienhuis | | |
| 2016/0233070 A1 * | 8/2016 | Gordon | ............ | H01J 49/04 |
| 2017/0016856 A1 * | 1/2017 | Zhang | ............ | G01N 1/02 |

FOREIGN PATENT DOCUMENTS

| | | | | |
|---|---|---|---|---|
| WO | WO-9321654 A1 * | 10/1993 | .......... | H01J 49/0404 |
| WO | 2009/020531 A1 | 2/2009 | | |

OTHER PUBLICATIONS

Search Report for GB Patent Application No. GB1704454.6, dated May 16, 2018.

Combined Search and Examination Report for GB Patent Application No. GB1810432.3, dated Jan. 16, 2019.

* cited by examiner

- Prior Art -

- Prior Art -

INTERFACE PROBE

CROSS-REFERENCE TO RELATED APPLICATIONS

This application claims priority to and benefit of United Kingdom Patent Application No. 1604882.9 entitled "INTERFACE PROBE," filed Mar. 22, 2016, the contents and teachings of which are hereby expressly incorporated herein by reference in their entirety.

BACKGROUND OF THE INVENTION

The present invention relates to an interface probe for use in a dual source mass spectrometry system.

A dual source mass spectrometry system is operable in a first mode with a liquid chromatography (LC) source [LC/MS] and in a second mode with a gas chromatography (GC) source [GC/MS]. The GC source is connectable to an ion source chamber for delivering the ionized output from the GC source to the mass spectrometer. The GC source unit comprises a GC interface probe wherein the GC source unit is retractably mounted to take the GC interface probe from a retracted position into a deployed position. In the retracted position, the GC interface probe is disengaged from the mass spectrometer of the system, such that the system is operable in said first LC/MS mode. In the deployed position, the GC interface probe is operatively connected to the ion source chamber of the mass spectrometer whereby the system is operable in said second GC/MS mode.

Dual source mass spectrometry systems are disclosed in WO2010100507, WO2010100508 and WO2010100509, the contents of which are incorporated herein in their entirety, and with which the interface probe of the present invention is operable in use.

The present invention seeks to provide an improved interface probe and components therefor.

BRIEF SUMMARY OF THE INVENTION

Accordingly, the present invention provides a GC fitting for an inner tube of a heated transfer line of a gas chromatography interface probe, the fitting comprising a first section comprising a substantially cylindrical projection for fluid connection to a GC source in use, and a second section having a larger radius than the first section in at least one direction, the second section being provided with at least one flat.

Preferably, the second section has only one line of symmetry.

Preferably, the second section is provided with two flats.
Preferably, the two flats diametrically oppose one another.
Preferably, the GC fitting is comprised of stainless steel.
Also disclosed is a GC interface assembly, comprising:
a GC fitting embodying the invention; and
a GC end cap securable to an outer tube of a heated transfer line of a gas chromatography interface probe, wherein the GC end cap comprises an aperture which slidably receives the second section of the GC fitting such that the GC fitting is substantially constrained to liner movement with respect to the GC end cap.

Preferably, the aperture is shaped to substantially correspond to the second section of the GC fitting.

The present invention further provides an analyser cap for an inner tube of a heated transfer line of a gas chromatography interface probe, the analyser cap comprising a cylindrical flange portion, a central socket and a wall portion extending between the flange portion and the central socket, wherein the thickness of the wall portion is substantially constant between the central socket and the flange portion.

Preferably, the thickness of the wall portion is substantially 1 mm.

Preferably, the wall portion is non-planar.
Preferably, both faces of the wall portion are non-planar.
Preferably, the central socket comprises an inner side having an aperture configured to receive the end of an inner tube therein; and an outer side providing an exit port, wherein the exit port is in fluid communication with the aperture so as to convey a sample in the inner tube through the exit port.

Preferably, the aperture is configured to receive the end of an inner tube with a substantially interference fit.

Preferably, the aperture is at least partially tapered.
Also disclosed is a an inner tube for a heated transfer line of a gas chromatography interface probe, comprising at least one of the GC fitting and the analyser cap.

Also disclosed is a heated transfer line comprising the inner tube.

Preferably, the heated transfer line further comprises at least one outer tube surrounding the inner tube, and at least one heating element associated with the inner tube.

Preferably, the inner tube is comprised of copper.
Preferably, the inner tube comprises a stainless steel GC fitting secured to a first end of the inner tube.

Preferably, a heated transfer line comprises a first outer tube, a second outer tube and intermediate tube.

Preferably, at least a portion of the intermediate outer tube has a thickness substantially identical to the thickness of either or both of the first and second tubes.

Preferably, the first outer tube, second outer tube and intermediate tube are secured together with an interface fit.

Preferably, the first outer tube, second outer tube and intermediate tube are additionally secured together with adhesive.

Preferably, the heated transfer line is translatably received in a housing.

Preferably, the interface further comprises a locking collar, rotatably mounted with respect to the housing.

Preferably, the interface further comprises a mounting flange for securing the interface to a plinth in use.

Preferably, the inner tube is mounted with respect to the mounting flange with a floating connection.

Also disclosed is a gas fitting, having an inlet port and an outlet port and a central bore defined between the inlet port and outlet port, wherein the second end of the inner tube is receivable in the outlet port in use, and a GC column is receivable through the inlet port for insertion through the central bore and into the bore of the inner tube, wherein the diameter of the central bore is less than or equal to the diameter of the bore of the inner tube.

Preferably, the diameter of the inlet port is less than or equal to the diameter of the central bore and/or the outlet port.

DETAILED DESCRIPTION OF THE INVENTION

Figure 1A:
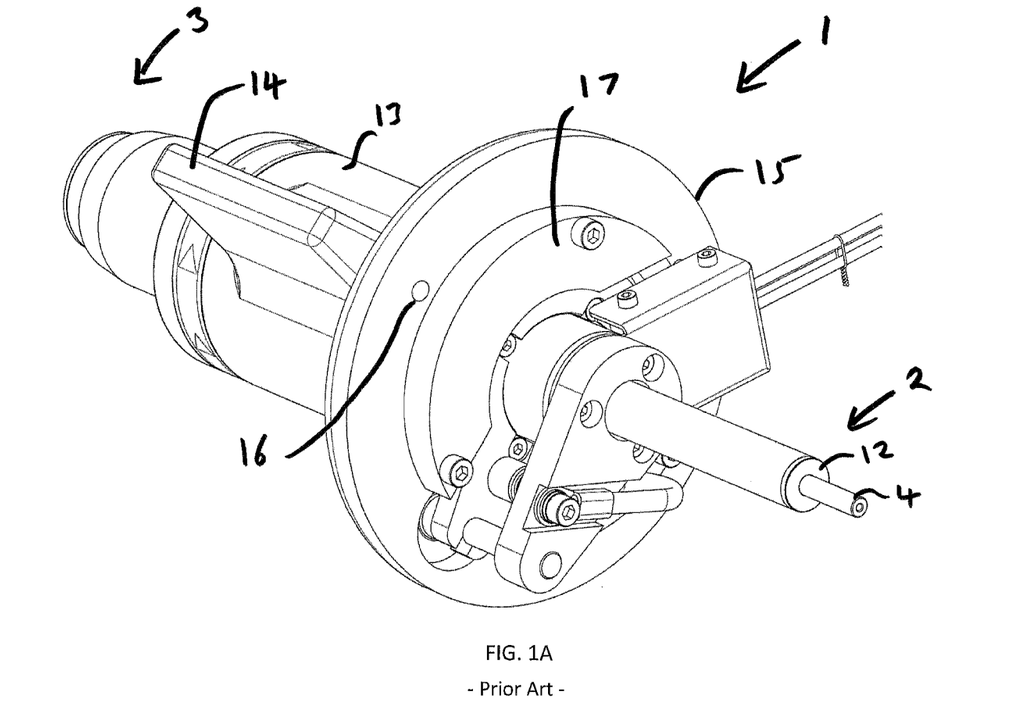
FIGS. 1A and 1B show isometric views of a known interface probe.
Figure 1B:
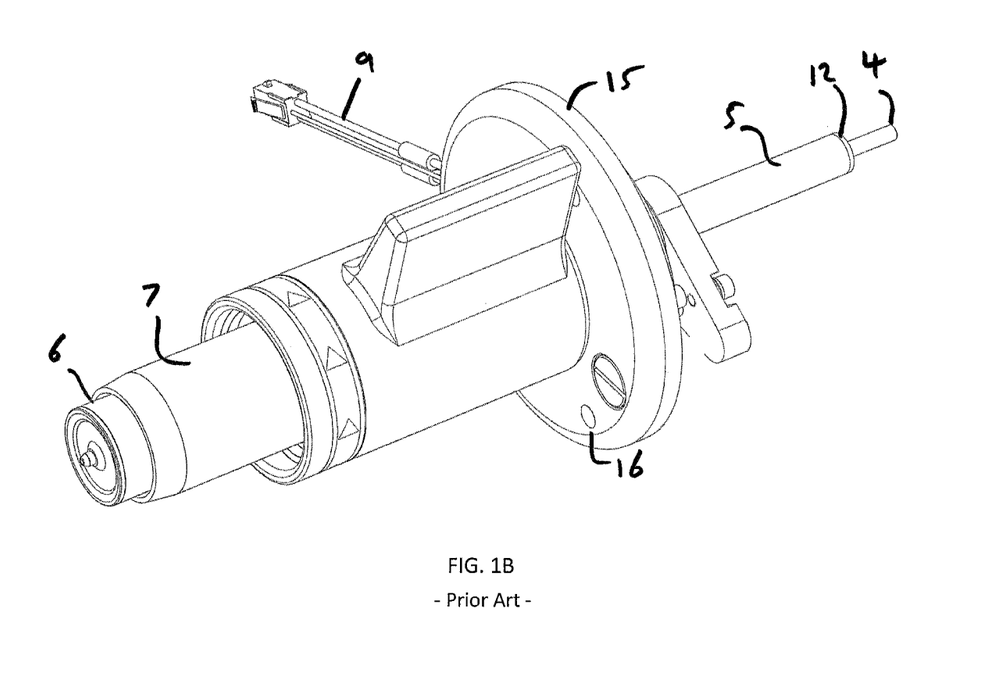
Figure 2:
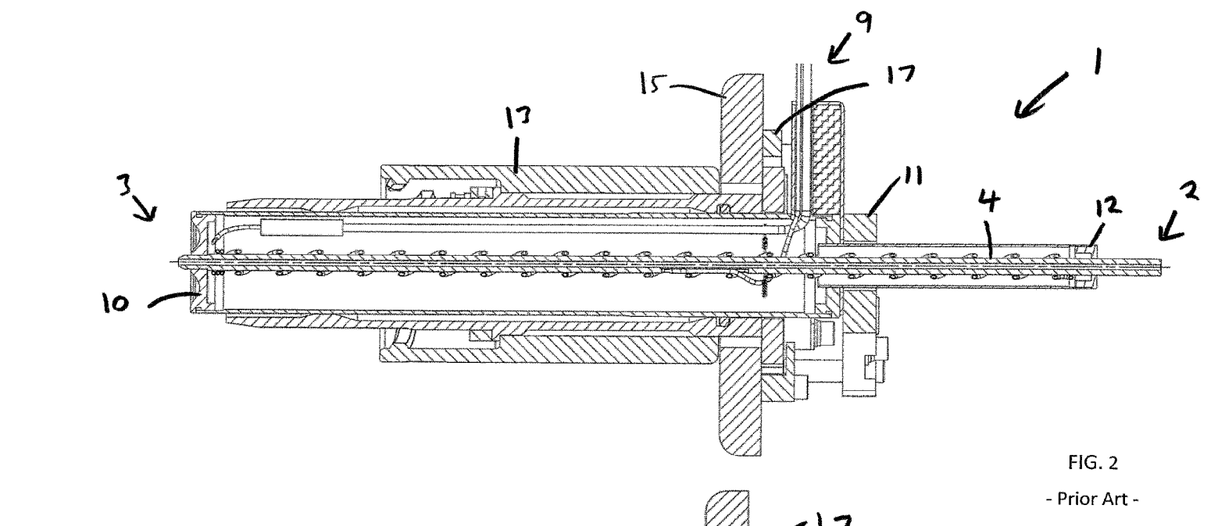
FIG. 2 illustrates a longitudinal cross-section, along a first plane, of the interface probe of FIGS. 1A and 1B.
Figure 3:
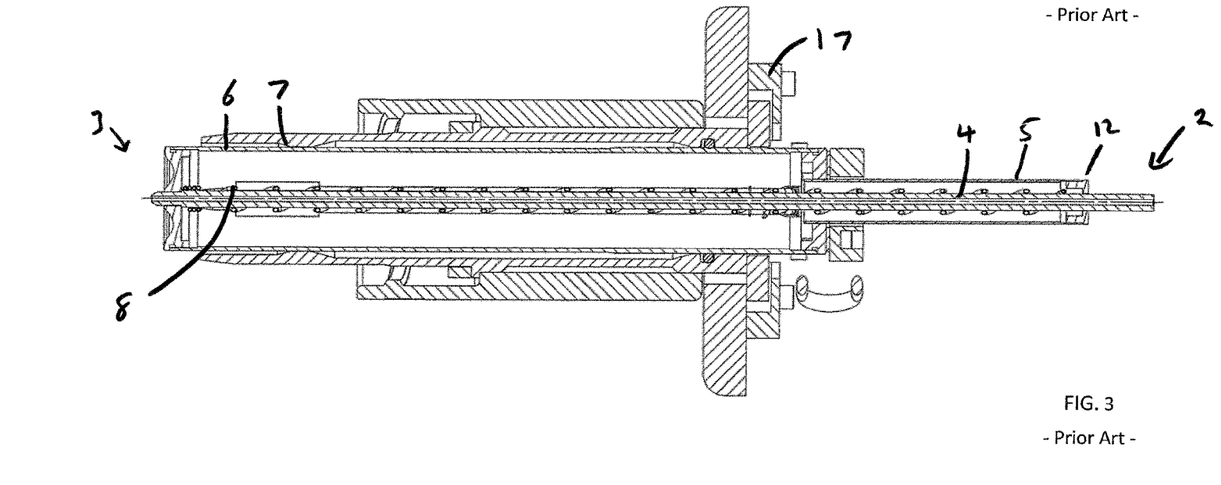
FIG. 3 illustrates a longitudinal cross-section, along a second plane, of the interface probe of FIGS. 1A and 1B.

FIGS. 1 to 3 illustrate a known interface probe 1. The interface probe 1 comprises a first end 2 for connection to a GC unit and a second end 3, opposite the first end 2, for connection to an ion source housing. The second end 3 of the interface probe 1 is receivable in a sample port of an ion source housing in a known manner.

The interface probe 1 comprises an inner tube 4 which accommodates a gas chromatographic column in use. The gas chromatographic column is for placing analyte molecules in the chamber of the ion source. The analyte molecules are suspended or dissolved in gas.

The column within the inner tube 4 contains a mobile phase and a stationary phase and is used to separate components based upon their vapour pressure. When compounds elute from the column into the ion chamber they are in the vapour phase. Gas chromatographic columns are known in the art and are available from several venders. For example, without limitation, gas chromatographic columns are sold by Restek (Bellefonte, Pa., USA) under several trademarks including Rxi® or MTX®.

The sample port of the ion source chamber operatively receives the inner tube 4 of the transfer line. Preferably, a gas chromatography column protrudes from the inner tube 4 by a predetermined amount (for example around 1 mm).

The inner tube 4 is surrounded by a first outer tube 5, adjacent the first end 2, and a second outer tube 6, adjacent the second end 3. At least a part of the second outer tube 6 is received within a generally cylindrical housing 7. The second outer tube 6 is translatably received within housing 7

A heater wire 8 is wrapped around at least a part of the inner tube 4. At least one temperature sensor is operatively connected to the inner tube 4 and/or heater wire 8, so as to allow a control system (not shown) to monitor and control the temperature of the inner tube 4. The combination of the inner tube 4 and heater wire 8 defines a heater transfer line (HTL).

The heater wire 8 is powered/controlled by wire(s) 9, which are fed through the outer tubes and exit the interface probe 1 at a point along its length.

The first 5 and second 6 outer tubes are connected to one another by an intermediate body 11. A GC end cap 12 is provided at the first end 2 of the interface probe 1 and an analyser end cap 10 is provided at the second end 3 of the interface 1 so as to create a notionally sealed chamber therebetween, defining a heated sheath tube. The inner tube 4 preferably protrudes from both the analyser end cap 10 and GC end cap 12. The inner tube 4 is received within the end cap 12 with a sliding fit, and corresponding seal, to allow for thermal expansion of the inner tube 4 and/or GC end cap 12.

The second outer tube 6 is welded to the analyser end cap 10 which, in turn, is welded to the inner tube 4.

The ion source housing includes a nozzle (not shown) which forms part of complementary docking means for detachably receiving the interface probe 1. The nozzle includes a sealing O-ring by which the GC interface probe 1 is sealingly engaged in the nozzle.

The interface probe 1 has another part of the complementary docking means which comprises a rotatable internally screw-threaded locking collar 13 which co-operates with a mating screw-threaded portion of the docking nozzle (not shown).

Accordingly, when the interface probe 1 is offered up to the nozzle, engagement of the complementary screw-threaded parts by rotation of the locking collar 13 causes the interface probe 1, and hence the GC column, to be progressively docked in the chamber of the GC ion source housing.

A handle lobe 14 is provided on the locking collar 13 to assist a user in rotating the collar 13 in use. The collar 13 is freely rotatable with respect to the housing 7, such that the housing 7 does not rotate in use.

A mounting flange 15 is connected to the housing 7. The flange 15 comprises apertures 16 for securing the flange 15 to the translatable plinth of the GC unit. The flange 15 allows the interface 1 to be secured to the GC unit.

Translation of the interface probe 1 towards and away from the ion source chamber may be effected by means of a rail system, as disclosed in WO2010/100507/8/9.

Improved Interface Probe

The present invention seeks to provide an improved interface probe and associated components.

Figure 4A:
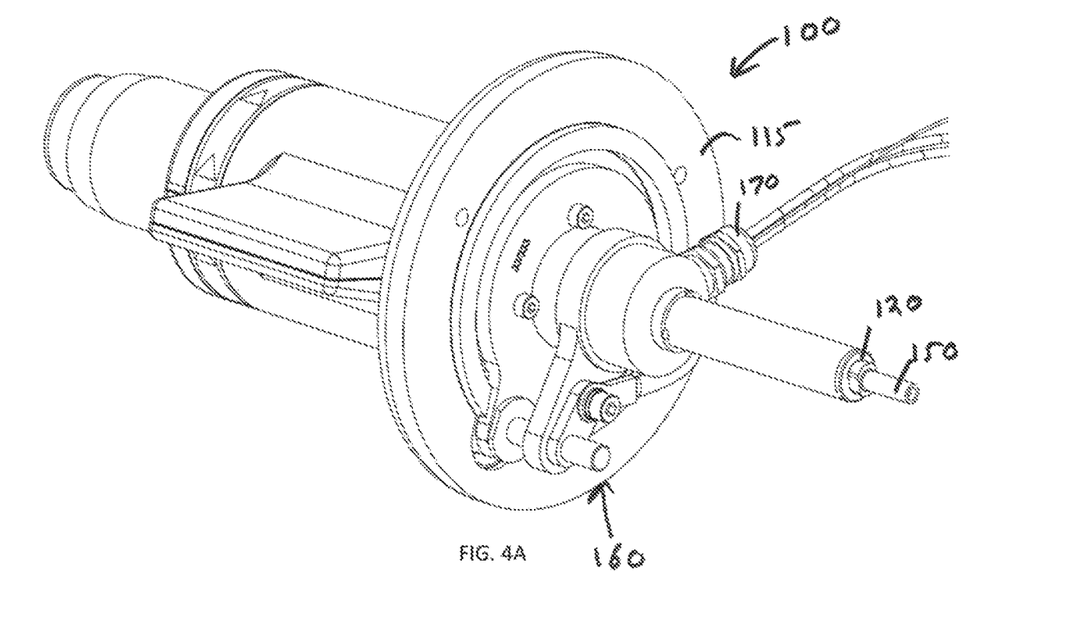
FIG. 4A and 4B show isometric views of an interface probe embodying the present invention.
Figure 4B:
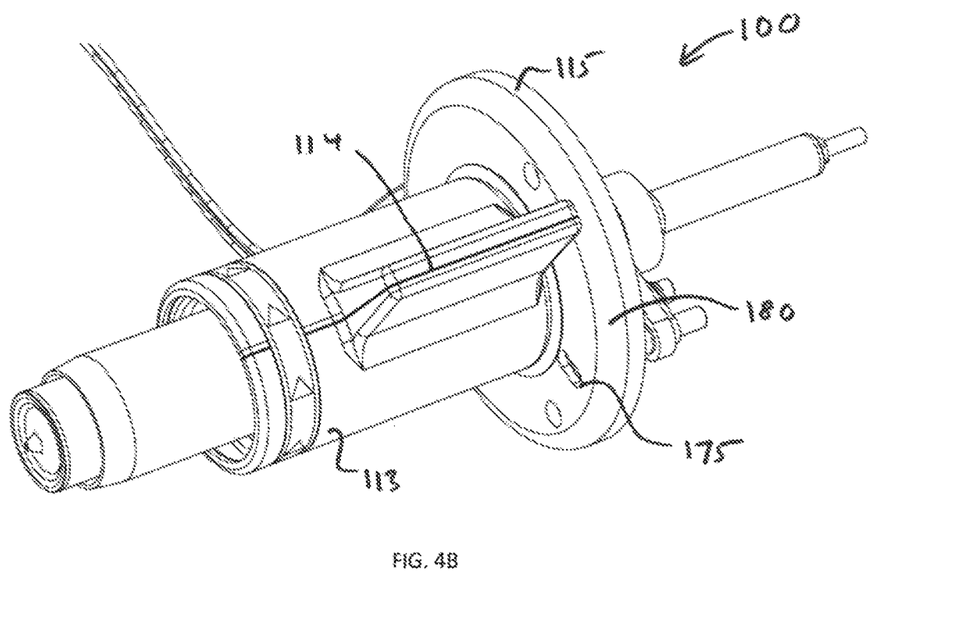
Figure 5:
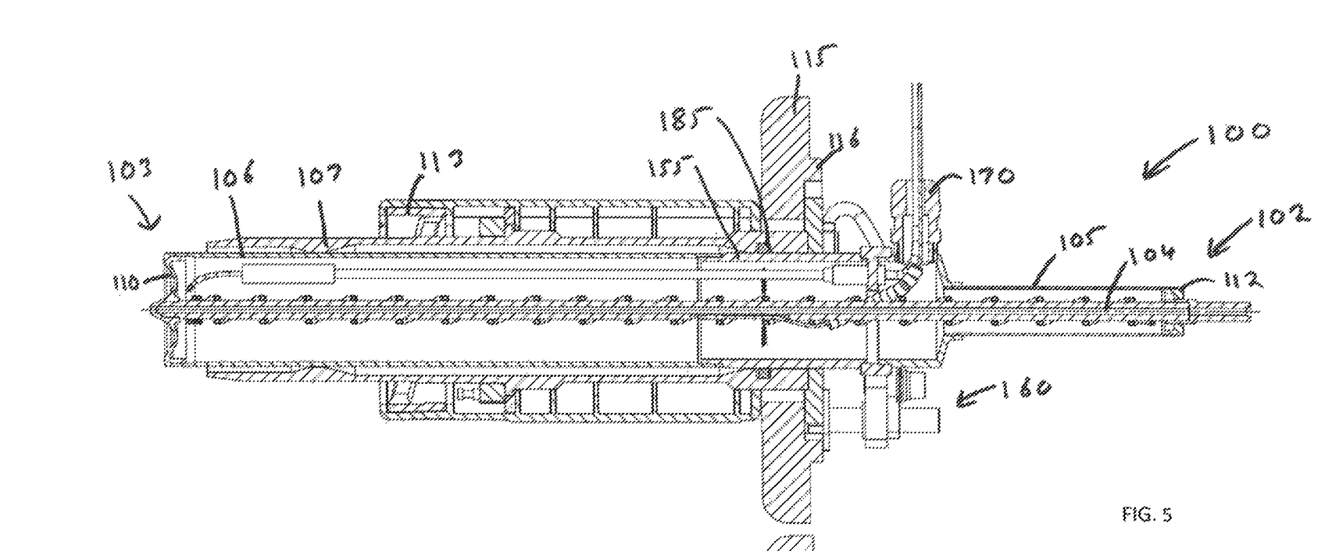
FIG. 5 illustrates a longitudinal cross-section, along a first plane, of the interface probe of FIGS. 4A and 4B.
Figure 6:
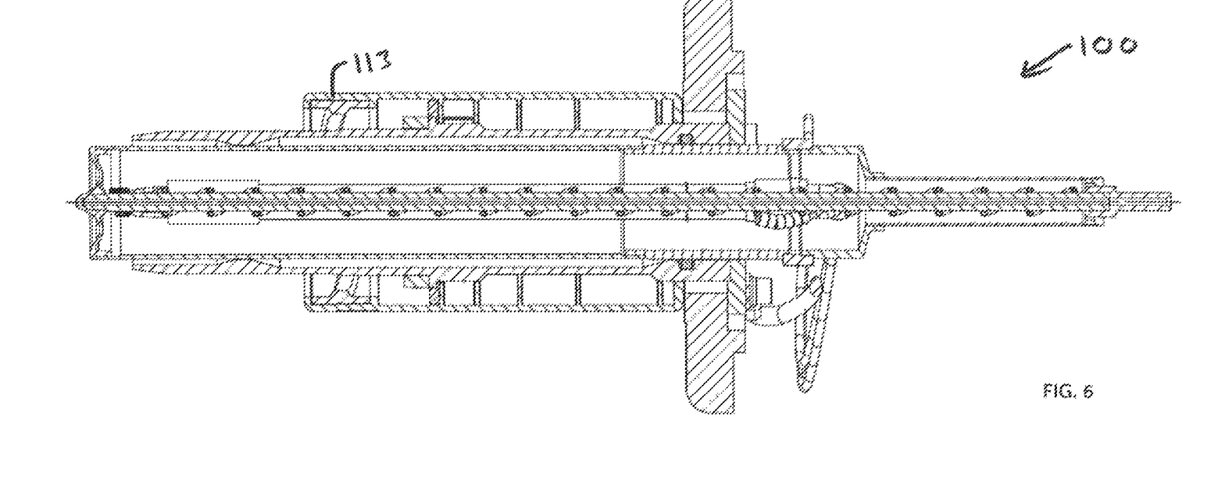
FIG. 6 illustrates a longitudinal cross-section, along a second plane, of the interface probe of FIGS. 4A and 4B.

An interface 100 embodying the present invention is illustrated in FIGS. 4 to 6.

The features of the interface probe 100 largely correspond in general function to those of the known interface probe 1. For ease of reference, similar numbers are used for corresponding features. The key differences will be described below.

Transfer Line

Figure 7:
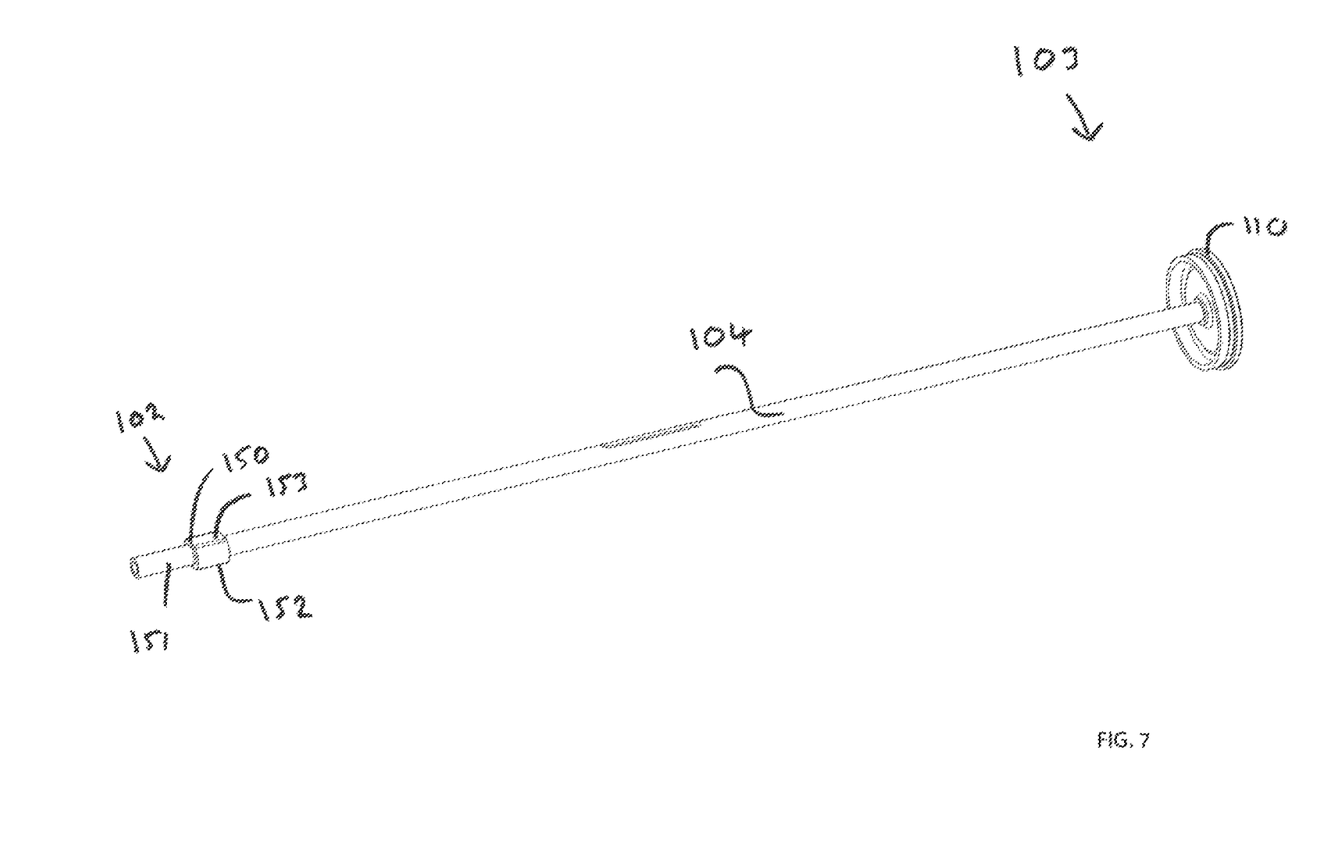
FIG. 7 illustrates an inner tube of an interface probe embodying the present invention.

FIG. 7 illustrates an inner tube 104 of a heated transfer line (HTL) of an interface probe 100 embodying the present invention, such as that illustrated in FIGS. 4a, 4b, 5 and 6.

The inner tube 104 comprises a first end 102 for connection to a GC unit and a second end 103, opposite the first end, for connection to an ion source housing.

The body of the inner tube 104 preferably comprises copper. Preferably, the outer diameter of the inner tube 104 is substantially 6 mm. Preferably, the diameter of the inner bore of the inner tube 104 is substantially 2 mm.

Prior art inner tubes 4 (such as those shown in FIGS. 1 to 3) comprise stainless steel, for example 316L stainless steel. It has been acknowledged by the present applicant that the thermal conductivity of known stainless steel inner tubes 4 is low (around 19 W/mK). The thermal conductivity of copper is higher than that of stainless steel. Preferably, the thermal conductivity of copper used in a copper inner tube 104 embodying the present invention is substantially 398 W/mK.

Figure 8:
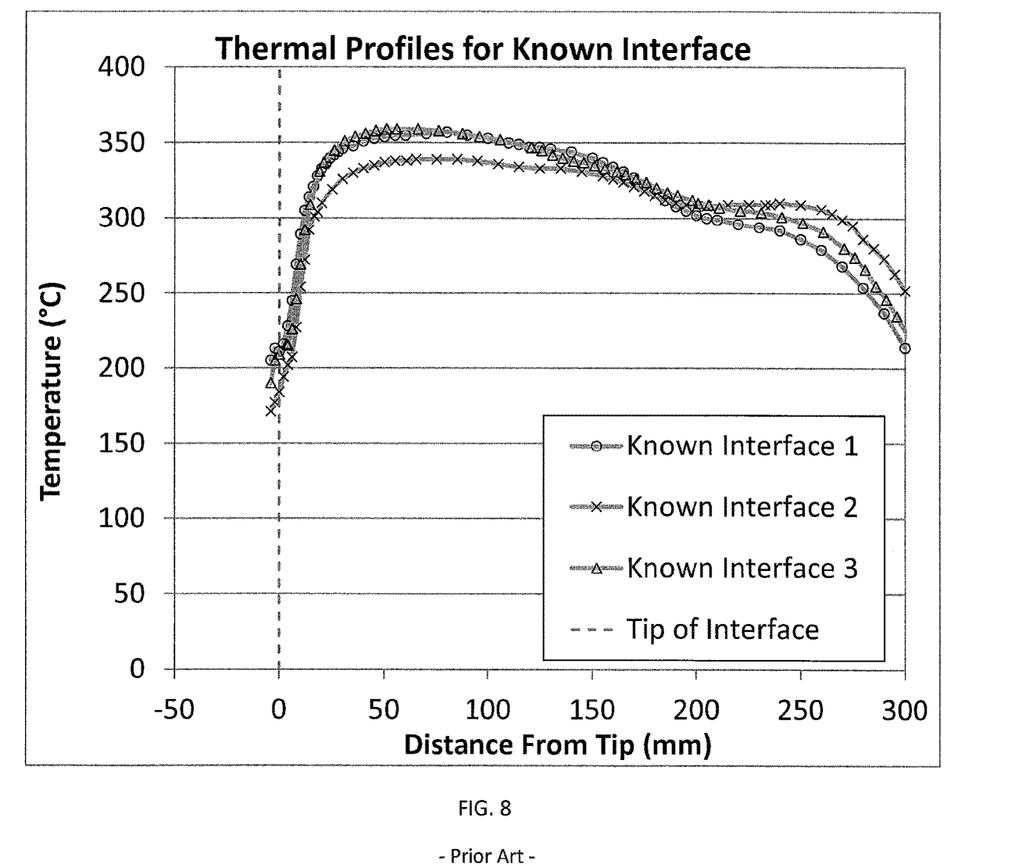
FIG. 8 illustrates the thermal profiles of various known interface designs.

Known stainless steel inner tubes 4 suffer from poor thermal continuity along the length of the interface 1. FIG. 8 shows the thermal profiles of various known interface 1 designs incorporating known stainless steel inner tubes. The temperature (Y axis) was measured by placing a thermocouple down the central axis of the interface probe in the location where the GC column resides.

The x-axis represents the distance down the inner tube 4 with respect to the outlet into the ion source region. The set regulation temperature is 310° C. As can be seen, there is a substantial temperature drop at the tip of the interface, within the first around 40 mm of the inner tube 4. There is also a significant region of overheating between around 40 mm to 170 mm into the interface where the temperature experienced can be up to 50° C. higher than the set regulation temperature. The portion of the transfer line HTL within the GC oven is from around 250 mm onwards and although a temperature drop is shown within this region it would be alleviated when the GC oven is up to operational temperature.

It has been observed that some of the adverse effects of the lack of thermal continuity within the known HTL are as follows:
  Poor chromatography for compounds with higher boiling points
  Accelerated column degradation in the last ~50 mm of the column, due to the condensation of higher boiling point components
  Scorching of the outside of the column within the overheated region, leading to degrading performance and brittleness
  A requirement to run the HTL at higher temperatures than would normally be required for a given analysis With a copper inner tube 104 embodying the present invention, thermal continuity is much improved.

Figure 9:
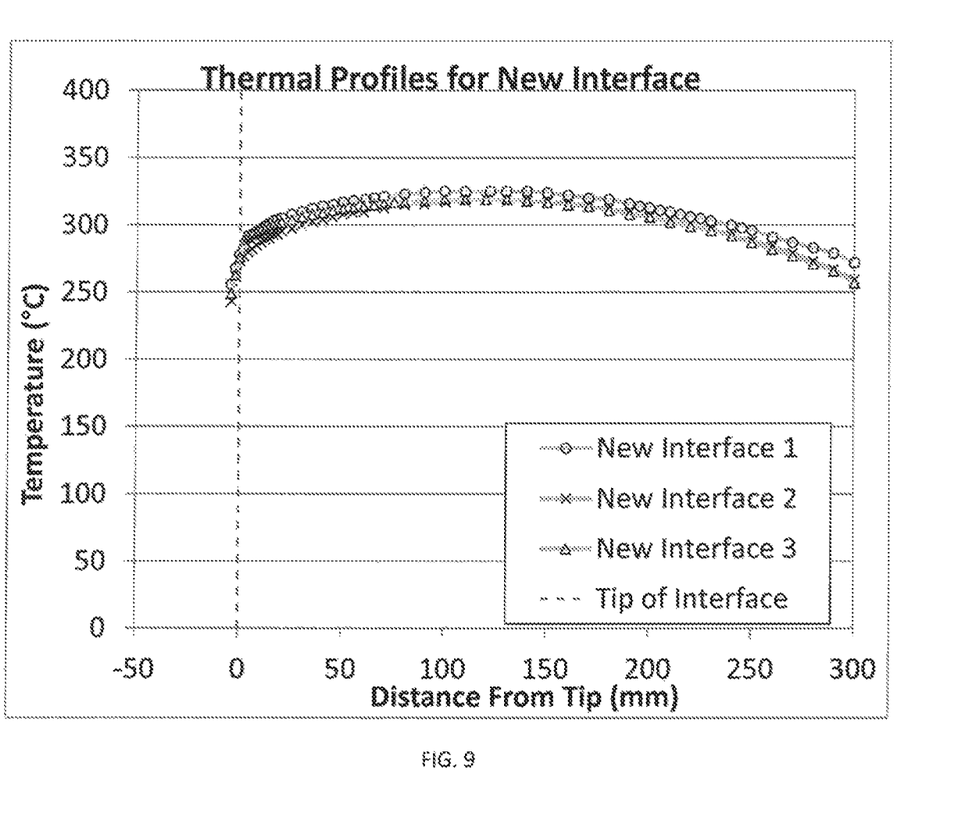
FIG. 9 illustrates the thermal profiles of an interface embodying the present invention.
Figure 10A:
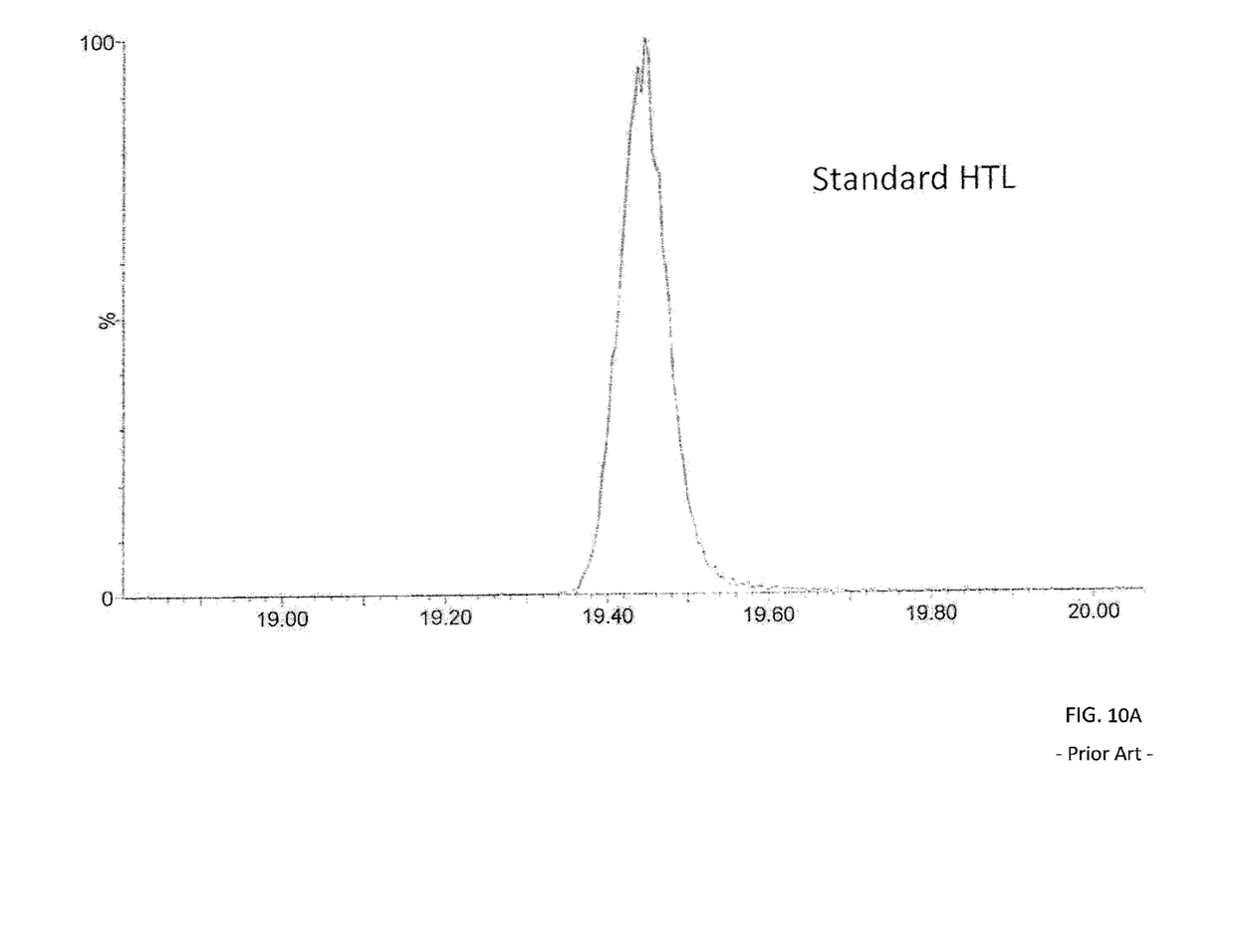
FIG. 10A illustrates a chromatogram of deca-brominated diphenyl ether (BDE209) for a known interface.
Figure 10B:
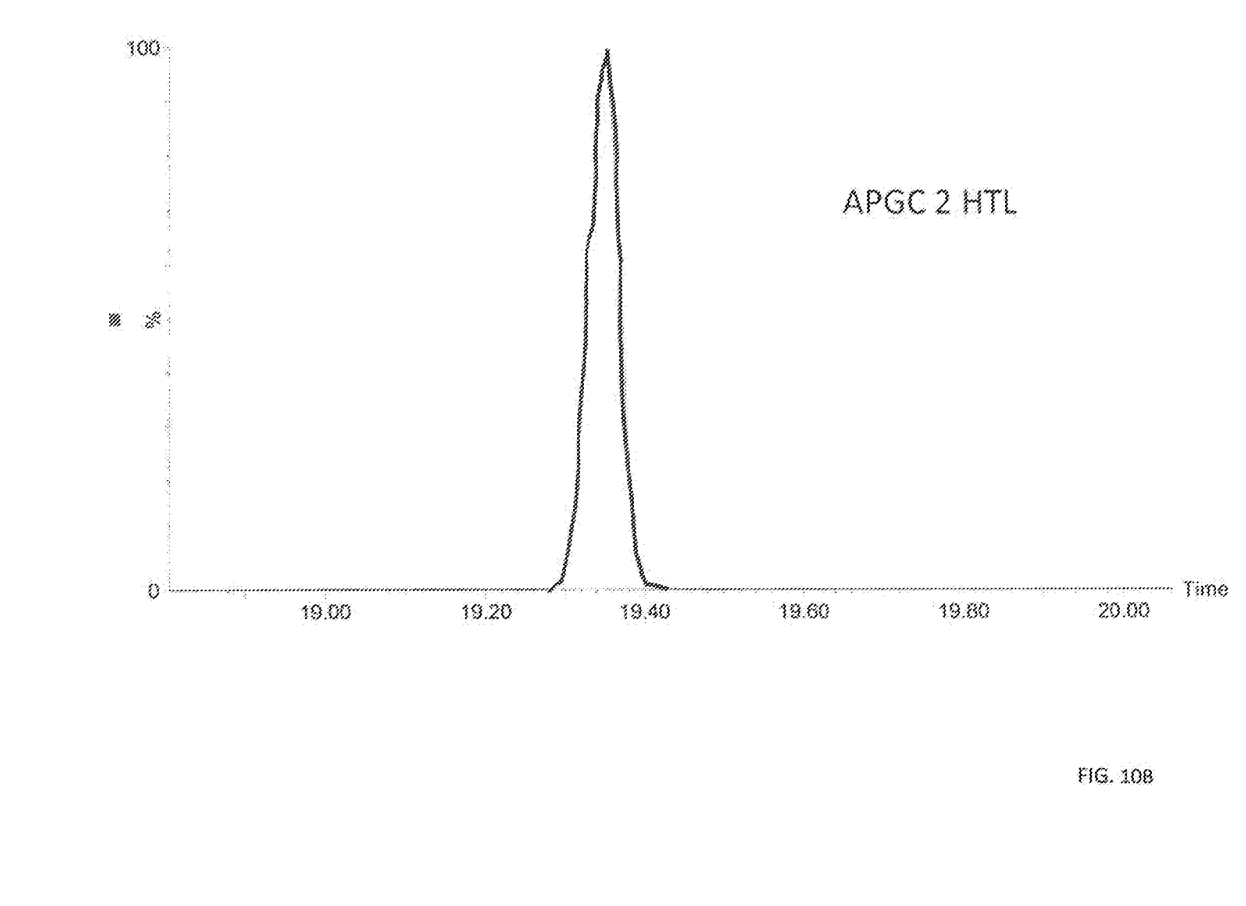
FIG. 10B illustrates a chromatogram of deca-brominated diphenyl ether (BDE209) for an interface embodying the present invention.

FIG. 9 illustrates the thermal profiles of three prototype interfaces embodying the present invention. The interfaces tested were notionally identical and, as will be appreciated from FIG. 9, provided substantially consistent and repeatable thermal profiles. As can be seen from FIG. 9, the thermal continuity of the new HTL design is significantly improved. The range of temperature fluctuation along the length of the inner tube 104 is smaller than that of the known, stainless steel, inner tube 4. As a result, the set temperature required for a given analysis is lower and GC column maintenance is significantly reduced. The chromatography of high boiling point samples is also improved. This is illustrated in FIGS. 10A and 10B, which show chromatograms of deca-brominated diphenyl ether (BDE209), with the heated transfer line set to 330° C., for both the known interface (10A) and an interface embodying the present invention (10B).

GC Fitting

In one embodiment, as shown in FIG. 7, the first end 102 of the inner tube 104 comprises a GC fitting 150, preferably formed of stainless steel. The GC fitting 150 has a first section 151 comprising a substantially cylindrical projection for fluid connection to the GC source, in a conventional manner. The GC fitting further has a second section 152 having a larger radius than the first section 151 in at least one direction. Preferably, the second section has only one line of symmetry. In the embodiment shown, the second section 152 comprises two opposing flats 153. In another embodiment, the second section 151 may only comprise one flat 153. In other words, the second section 152 is substantially cylindrical apart from the flat(s) 153.

The second section 152 is slidably received in an aperture in the GC end cap 112. The aperture is shaped to substantially correspond with the profile of the second section 152 of the GC fitting, such that the second section 152 is substantially constrained to linear movement with respect to the GC end cap 112. Linear movement will occur due to thermal expansion of the inner tube 104 as it is heated between various temperatures. A benefit of the at least one flat is that rotation of the GC fitting about its longitudinal axis is substantially prevented. During connection of the probe interface 100 to the GC source, if any torque is applied to the interface probe 100, for example during connection and detachment of the gas fittings, the torque will be transferred through the second section 152 of the GC fitting, through the GC end cap 112 and into the relatively rigid first outer tube 105, rather than serving to twist the relatively delicate inner tube and/or the associated heater windings and sensors. Any torsional force on the inner tube and/or heater windings and sensors may cause damage or failure. A benefit of having two flats 153 present on the design is that a spanner can be used to brace the GC fitting 150 while torsional force is applied while fitting the GC gas fitting 200.

A further benefit of the GC fitting 150 is that it serves to protect the end of the inner tube. While a copper inner tube provides excellent thermal properties, it is relatively softer than the stainless steel of the GC fitting 150 or prior art inner tube 4. Accordingly, a copper inner tube with a stainless steel GC fitting on one end provides the improved thermal continuity as described above, whilst still providing a robust mechanical connection to the GC column.

The copper inner tube 104 is preferably secured to the GC fitting by brazing.

It will be appreciated that whilst the inner tube described above comprises a copper inner tube with the GC fitting, these features are not essential. The GC fitting could be provided on an otherwise conventional inner tube.

Analyser Cap

Figure 14A:
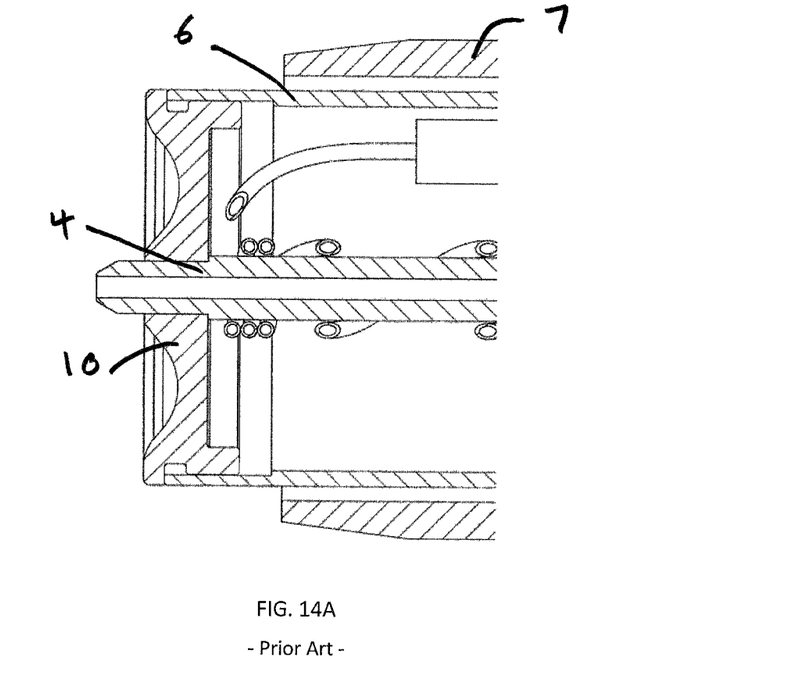
FIG. 14A illustrates a known analyser cap.

The second end 103 of the inner tube 104 is provided with an analyser cap 110, which serves to close the chamber at the end of the second outer tube 105. As compared to the analyser cap 10 (FIG. 14a) of the known interface probe 1, the analyser cap 110 (FIG. 14b) of an interface probe 100 embodying the present invention is thinner. Preferably, the analyser cap 110 is 1 mm thick at its thinnest point, in the direction of the longitudinal axis of the interface 100, as compared to the known analyser cap 10 which is 2.8 mm thick at its thinnest point. The reduced thickness analyser cap 100 has reduced cross section and, as a result, minimised heat loss, in use, in the region of the second end 103 of the interface 1.

Figure 14B:
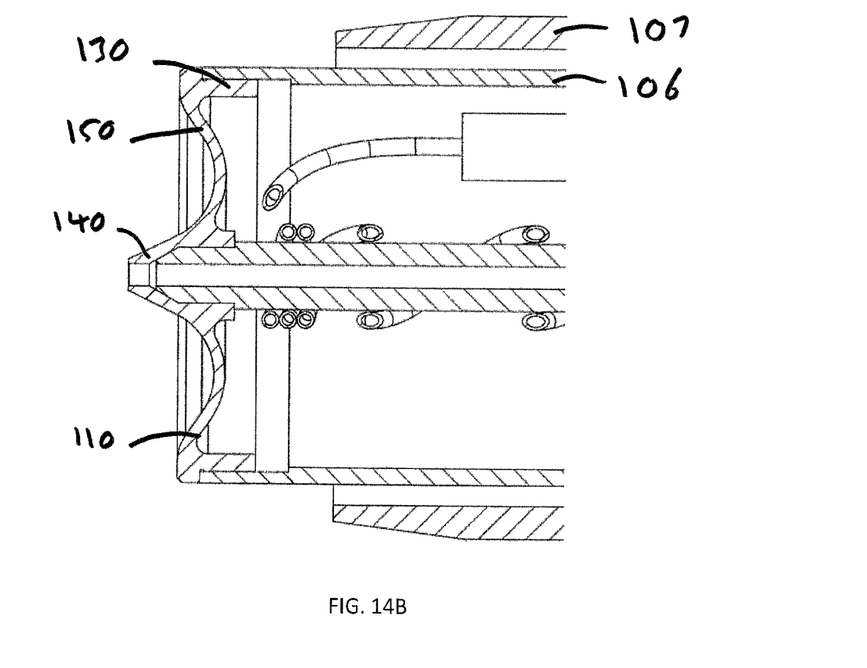
FIG. 14B illustrates an analyser cap embodying the present invention.

Preferably, the analyser cap 110 comprises a cylindrical flange portion 130, for engagement with and attachment to the inner surface of the outer tube 106. Further, the analyser cap comprises a central socket 140 for receiving the second end of the copper inner tube 104. The copper inner tube 104 is preferably received in the socket 140 with an interface fit and/or is brazed. Furthermore, the analyser cap 110 comprises a wall portion 150, extending between the central socket 140 and the flange portion 130. Preferably, the thickness of the wall portion 150 is substantially constant between the central socket 140 and flange portion 130. Preferably, as shown, the wall portion 150 is non-planar. An outer surface of the wall portion 150 of the analyser cap 110 is shaped so as to correspond generally to the profile of the outer surface of the known analyser cap 10 (see FIG. 14a), but with a continuous profile in the central section up to the exit port of the analyser cap. The continuous profile is designed to minimise the occurrence of gas turbulence when high gas flows are present between the external surface of the analyser cap 110 and the ionisation source (not shown). Whereas the inner surface of the known analyser cap 10 is planar, the inner surface of the wall portion 150 of the analyser cap 110 is shaped so as to substantially correspond to that of the outer surface. The inner and outer surfaces of the wall portion 150 of the analyser cap 110 are substantially parallel to one another at a predetermined point.

The use of the socket 140 also precludes the need for welding on the external surface of the analyser cap 110, again yielding a more continuous profile. An additional benefit of this approach is that the exposed, protruding portion of the assembly is constructed of a durable material, rather than the copper of the inner tube 104, and is thus more mechanically resistant to inadvertent damage.

The internal form of the socket 140 is tapered such that the insertion of a fused silica capillary column down the bore of the interface is less likely to result in the tip of the fragile column being damaged.

The cylindrical flange portion 130 is preferably configured to form an interference fit with the second outer tube 106 and present a smooth external surface. This is advantageous when assembling the device as it minimises the risk of damage to the seal 185, in contrast to the construction of known external cap and its use of a welded seam.

It will be appreciated that whilst the inner tube described above comprises a copper inner tube with the analyser cap and the GC fitting, it is not essential to have all the features. The analyser cap, and/or the GC fitting could be provided on an otherwise conventional inner tube. Likewise, a copper inner tube could be provided without the additional features of the GC fitting or the analyser cap.

Intermediate Outer Tube

In the arrangement shown in FIGS. 1 to 3, the first 5 and second 6 outer tubes are connected to one another by an intermediate body 11. The intermediate body 11 is relatively massive and has therefore been found, undesirably, to transfer heat away from the inner tube in use, reducing thermal continuity of the inner tube.

In an interface probe 100 embodying the present invention, there is provided an intermediate outer tube 155. The first outer tube 105 is connected to a first axial end of the intermediate outer tube 155 and the second outer tube 106 is connected to a second axial end of the intermediate outer tube 155. The first axial end of the intermediate outer tube 155 has a smaller diameter than the second axial end of the intermediate outer tube 155.

Preferably, the axial ends of the intermediate outer tube 155 are sized as to receive, or be received by, the respective axials ends of the first 105 and second 106 outer housings with an interference fit. Likewise, the analyser end cap 110 and GC end cap 112 are sized to receive, or be received by, the corresponding axial ends of the first 105 and second 106 outer housings with an interference fit. Preferably, some or all of the interference fit connections between the end caps 110, 112, the first 105, intermediate 155 and second outer 106 tubes are further provided with adhesive. The use of adhesive (rather than welds as used with known interfaces), allows for the components to be detached to allow for fault investigation, repair and upgrade work. In other words, the components are releasably attached to one another.

The diameter of the first outer tube 105 has been selected in order to minimise thermal losses from the inner tube 104 to the laboratory environment. This minimises the power required to maintain the set temperature of the transfer line, dictated by the requirements of the analysis being performed. A reduction in diameter between the second 106 and first 105 tubes is required in order to couple the interface to a standard gas chromatography oven. The reduced diameter of the outer tube 105 leads to greater thermal losses than those in the vicinity of outer tube 106. The design of the intermediate body 155 maintains the desirable diameter of outer tube 106 for a greater portion of the length of the interface and thereby minimises the thermal losses of the interface overall.

Preferably, at least a portion of the intermediate outer tube 155 has a thickness substantially identical to the thickness of either or both of the first 105 and second 106 tubes.

Whilst in a preferred embodiment the intermediate outer tube 155 is adopted in combination with the inner tube, GC fitting and analyser cap described above, this is not essential. The intermediate tube 155 may be adopted with an interface which has an otherwise conventional inner tube.

In the known interface 1 shown in FIGS. 1 to 3, there is provided an aluminium plate 17 comprising location features. In an interface 100 embodying the present invention, the mounting flange 115 is provided with integral location features 116, thus obviating the need for the additional aluminium plate 17 of the known interface 1. The location features 116 serve to locate and guide the interface 100 into the plinth assembly in use.

Preferably, the inner assembly (i.e. the first 105 and second 106 outer tubes and their contents) is linearly translatable with respect to the housing 107. In use, when the interface 100 is fully engaged with the APGC source enclosure, the proximity of the end of the interface with respect to the ionisation chamber is critical to sensitivity and stability of ionisation, and typically needs to be controlled to within <0.5 mm. Accordingly, an axial adjustment arrangement 160 is provided, which comprises a brass insert nut and bearing. This is advantageous over the known interface 1, in which the axial adjustment arrangement comprises stainless steel components. Since it is not permissible to provide lubricant in these locations, the use of stainless steel promotes galling and/or seizing of parts.

The provisions of the axial adjustment arrangement 160 allows a user to offset the effect of compounded tolerances in the various components, such that the alignment of the end of the interface 100 with respect to the ionization chamber can be controlled.

As shown in FIGS. 4a and 5, the interface 100 comprises a ferrule 170 connected to intermediate outer tube 155. The control and power wires are passed through the ferrule 170. The ferrule eliminates the need for the box formed of sheet metal adopted in the known interface 1. There is no longer any need to split the two halves of the heated transfer line assembly in order to mount it on or remove it from the plinth.

The mounting flange 115 is provided with an access aperture 175, for providing access to the axial adjustment arrangement 160. Preferably, the aperture 175 is sized so as to have a smaller diameter than a user's finger. Adjustment can be made using a tool (preferably a hex key) insertable into the aperture 175.

In the known interface 1, the corresponding access aperture is relatively large and able to receive a user's fingers so required an additional protective cap to be inserted in use. An interface 100 embodying the present invention does not need an additional protective cap.

In use, there will likely be misalignment between the instrument source and the plinth. Accordingly, the heated transfer line is arranged to allow the second end 103 to displace in a direction substantially perpendicular to the longitudinal axis of the interface 100. The extent of permitted displacement (floating) is preferably 6 mm.

The mounting flange 115 preferably comprises an annular rim 180 on the side of the mounting flange 115 adjacent the locking collar 113. Conveniently, in use, the annular rim 180 provides a visual guide to indicate the extent to which the heated transfer line has displaced in a direction substantially perpendicular to the longitudinal axis of the interface 100. It is undesirable for the heated transfer line to have displaced to an extreme, which may cause leaks and/or adverse strain on the components. The annular rim 180 conveniently visually alerts the user.

Preferably, the locking collar 113, including handle lobe 114 are injection moulded in plastic.

A seal 185 is provided between the intermediate outer tube 155 and the housing 107. Preferably, the seal is a quad ring seal. The quad ring seal reduces friction as compared to the O-ring seal adapted by the known interface 1.

Figure 11:
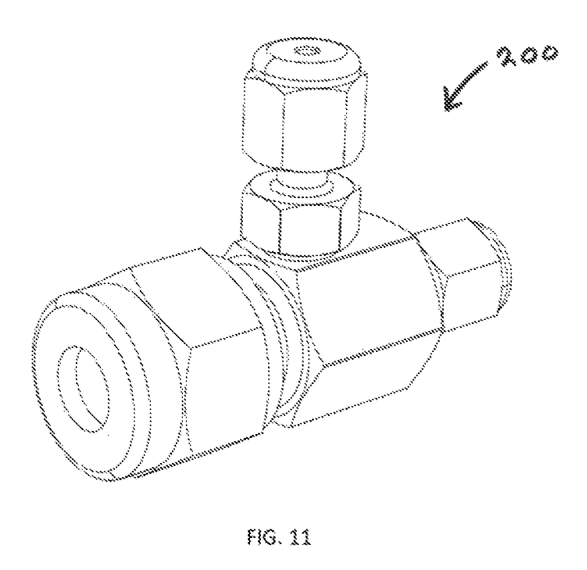
FIG. 11 illustrates a gas fitting which may be used with an interface probe embodying the present invention.
Figure 12:
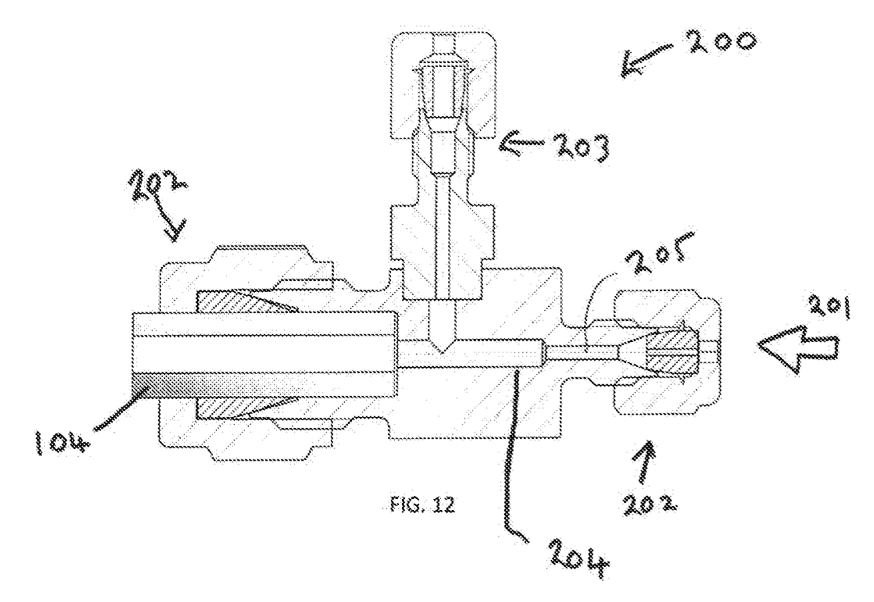
FIG. 12 illustrates a cross section of the gas fitting of FIG. 11.
Figure 13:
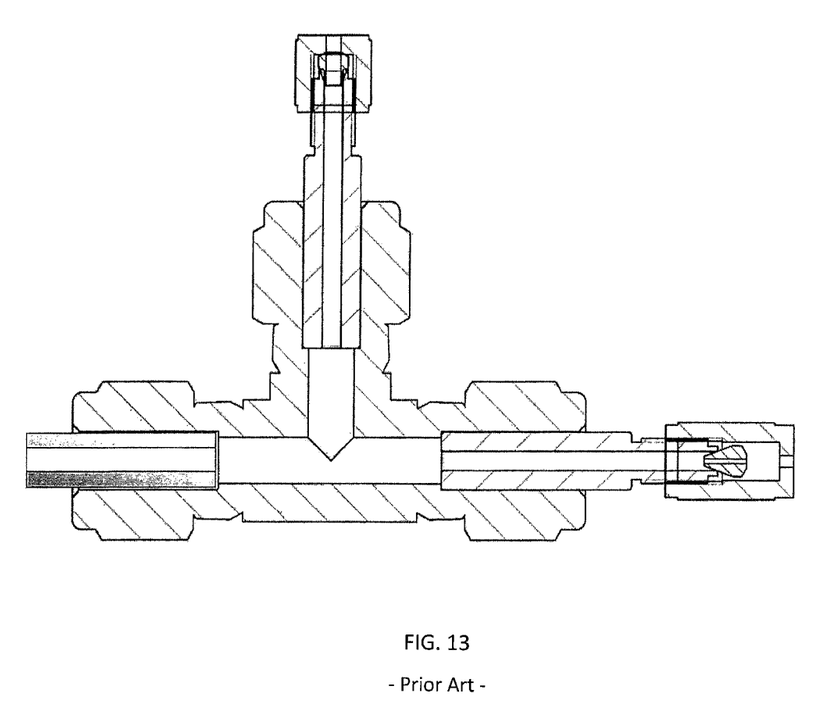
FIG. 13 illustrates a known gas fitting.

FIGS. 11 and 12 illustrate a gas make-up T-piece gas fitting 200. FIG. 13 illustrates a prior art gas fitting.

The gas fitting 200 comprises a column inlet port 201 and an outlet port 202. The inner tube of the interface 104 is receivable in the outlet port 202 in use. The fitting 200 further comprises a gas make-up inlet port 203. Each of the column inlet port 202, outlet port 202 and gas make-up inlet port 203 comprise a resilient ferrule and associated nut, for securing a conduit/column/capillary therein.

The fitting comprises a central bore 204 and an inlet bore 205. In use, a column is inserted into the bore of the column inlet ferrule. From there, the column passes through the inlet bore 205 and into the central bore 204.

In use, a GC column is inserted into the fitting in the direction indicated by arrow 201 in FIG. 12.

Preferably, the diameter of each of the bores/apertures between the point of insertion and the inner tube progressively increase, or at least remain constant.

Preferably, the diameter of the central bore 204 is less than or equal to the diameter of the bore of the inner tube. Preferably, the diameter of the inlet bore 205 is less than or equal to the diameter of the bore of the central bore 204. Preferably, the diameter of the bore of the ferrule provided in the inlet port 203 is less than or equal to the diameter of the inlet bore 205.

Conveniently, the above arrangement ensures that the GC column can be inserted into the gas fitting 200 and into the bore of the inner tube without impinging ('snagging') on any internal surfaces which oppose the direction of insertion. This is caused by the fact that the diameter of the bores through which the GC passes remain the same, or increase.

By comparison, with reference to FIG. 13, the diameter of the central bore of the prior art fitting is greater than the diameter of the bore of the inner tube. Accordingly, as a GC column is inserted, any misalignment of the GC column during insertion will likely cause the GC column to impinge on the end face at the transition between the central bore and the inner tube (i.e. the entrance into the inner tube). The problem is exacerbated by the user being unable to see the end of the inner tube during the installation process. The user is thus required to 'hunt' around for the bore of the inner tube by moving the GC column around, which risks damage to the column and/or inner tube.

The known fitting shown in FIG. 13 is 89 g. A fitting according to that illustrated in FIGS. 11 and 12 is preferably around 36 g.

The fitting is preferably used in connection with the heated transfer line as described herein. However, it will be appreciate that the fitting may likewise be adopted with convention heated transfer lines.

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

The invention claimed is:

1. An analyser cap for an inner tube of a heated transfer line of a gas chromatography interface probe, the analyser cap comprising a tubular flange portion having a first axial end and a second axial end, a central socket and a wall portion extending between the first axial end of the tubular flange portion and the central socket, the wall portion having two faces, wherein the central socket comprises an outer side defining an exit port, wherein the thickness of the wall portion is substantially constant between the central socket and the flange portion and both faces of the wall portion are non-planar and the wall portion is curved inwardly between the central socket and the first axial end of the flange portion and has a continuous profile up to the exit port of the analyser cap.

2. An analyser cap according to claim 1, wherein the thickness of the wall portion is substantially 1 mm.

3. An analyser cap according to claim 1, wherein the central socket comprises an inner side having an aperture configured to receive the end of an inner tube therein; and an outer side defining an exit port, wherein the exit port is in fluid communication with the aperture so as to convey a sample in the inner tube through the exit port.

4. An analyser cap according to claim 3, wherein the aperture is configured to receive the end of an inner tube with a substantially interference fit.

5. An analyser cap according to claim 3, wherein the aperture is at least partially tapered.

6. An inner tube for a heated transfer line of a gas chromatography interface probe, comprising the analyser cap of claim 1.

7. A heated transfer line comprising the inner tube of claim 6, further comprising at least one outer tube surrounding the inner tube, and at least one heating element associated with the inner tube.

8. A gas chromatography interface probe comprising the analyser cap of claim 1.

* * * * *